United States Patent
Beer et al.

(10) Patent No.: US 9,249,245 B2
(45) Date of Patent: Feb. 2, 2016

(54) STABILIZER FOR POLYOLEFINS AND PROCESS FOR PREPARING SUCH A STABILIZER

(71) Applicant: KE KELIT Kunststoffwerk Gesellschaft m.b.H., Linz (AT)

(72) Inventors: Stephan Beer, Linz (AT); Ian Teasdale, Linz (AT); Oliver Brueggemann, Wilhering (AT); Karl Rametsteiner, Linz (AT)

(73) Assignee: KE KELIT Kunststoffwerk Gesellschaft m.b.H., Linz (AT)

( * ) Notice: Subject to any disclaimer, the term of this patent is extended or adjusted under 35 U.S.C. 154(b) by 0 days.

(21) Appl. No.: 14/411,128

(22) PCT Filed: Jun. 24, 2013

(86) PCT No.: PCT/AT2013/050124
§ 371 (c)(1),
(2) Date: Dec. 24, 2014

(87) PCT Pub. No.: WO2014/000008
PCT Pub. Date: Jan. 3, 2014

(65) Prior Publication Data
US 2015/0361198 A1    Dec. 17, 2015

(30) Foreign Application Priority Data
Jun. 25, 2012    (AT) ............................... A 50246/2012

(51) Int. Cl.
*C08F 36/00*    (2006.01)
*C08F 210/00*    (2006.01)
*C08F 136/14*    (2006.01)

(52) U.S. Cl.
CPC .................................. *C08F 136/14* (2013.01)

(58) Field of Classification Search
CPC .......... C08F 36/20; C08F 36/22; C08L 23/00; C08L 23/02; C08L 101/06; C08L 101/08; C08L 47/00; C08K 5/00; C08K 5/13; C08K 5/1345
USPC ................................................. 526/335, 348
See application file for complete search history.

(56) References Cited

FOREIGN PATENT DOCUMENTS

WO    2009/015274 A2    1/2009
WO    2010/115009 A2    10/2010

OTHER PUBLICATIONS

S. Al-Malaika et al., "Reactive processing of polymers: mechanisms of grafting reactions of functional antioxidants on polyolefins in the presence of a coagent", Elsevier, Polymer Degradation and Stability 49 (1995) pp. 77-89.*
International Search Report of PCT/AT2013/050124, mailed Jan. 21, 2014.
Xue et al., Synthesis and radical scavenging ability of new polymers from sterically hindered phenol functionalized norbornene monomers via ROMP, Polymer, Elsevier, ScienceDirect, Polymer 48 (2007) pp. 5005-5015.
Watson et al., Functionalized Polyethylene via Acyclic Diene Metathesis Polymerization: Effect of Precise Placement of Functional Groups, Macromolecules 2000, 33, pp. 8963-8970.
S. Al-Malaika et al., Reactive processing of polymers: mechanisms of grafting reactions of functional antioxidants on polyolefins in the presence of a coagent, Elsevier, Polymer Degradation and Stability 49 (1995) pp. 77-89.

* cited by examiner

*Primary Examiner* — William Cheung
(74) *Attorney, Agent, or Firm* — Collard & Roe, P.C.

(57) ABSTRACT

A stabilizer for polyolefins using phenolic antioxidants and the preparation thereof are described, wherein the phenolic antioxidants according to the structural formula

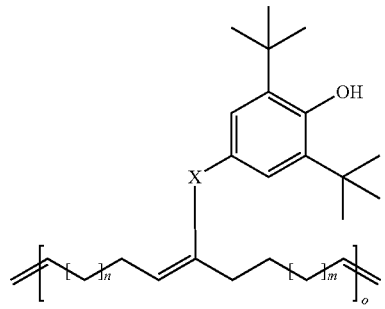

are bound as side chains to a polymer, wherein
X stands for [—$CH_2$—Y—COCH=CH—], [—$CH_2$—Y—CO—$(CH_2)_p$—], or [—$CH_2$—Y—$(CH_2)_p$—] where Y=S, O, or NH and where p=0-10 and
n=1-8, m=1-8, and o=5-100.

7 Claims, No Drawings

STABILIZER FOR POLYOLEFINS AND PROCESS FOR PREPARING SUCH A STABILIZER

CROSS REFERENCE TO RELATED APPLICATIONS

This application is the National Stage of PCT/AT2013/050124 filed on Jun. 24, 2013, which claims priority under 35 U.S.C. §119 of Austrian Application No. A 50246/2012 filed on Jun. 25, 2012, the disclosure of which is incorporated by reference. The international application under PCT article 21(2) was not published in English.

1. FIELD OF THE INVENTION

The invention relates to a stabilizer for polyolefins using phenolic antioxidants and to a method for preparing the stabilizer.

2. DESCRIPTION OF THE PRIOR ART

Contact with oxygen causes oxidative degradation in plastics, which is accompanied by a change of the material properties. The speed-determining step of auto oxidation is the hydrogen cleavage from the polymer chain by a peroxide radical, which results in the formation of a polymer-bound hydroperoxide and finally in the chain fracture. Upon the addition of hydrogen donors having hydrogen atoms which are easy to cleave off, this hydrogen cleavage from the polymer chain is suppressed, since instead the added hydrogen donor is consumed.

In the stabilization of polymers, in addition to aromatic amines, above all phenolic antioxidants are used as hydrogen donors. The decisive reaction is the formation of the hydroxy peroxide by hydrogen cleavage from the phenol with formation of a phenoxy radical. The stability of the phenoxy radical is determined by the steric obstruction of the substituents in the 2,6 positions, wherein in particular 2,6-di-tert-butylgruppen cause good stabilization. The aging resistance of a polymer is also determined in this context by the physical loss of the additives used, in addition to the consumption of stabilizers. For good antioxidants, therefore good solubility and uniform distribution in the polymer, a low diffusion rate, and low volatility are preferred. In this case, the effectiveness of the stabilization is influenced in particular by the molar mass of the antioxidants, because of which antioxidants having higher molar mass are used, for example, a pentaerythritol-tetrakis [3-(3,5-di-tert-butyl-4-hydroxyphenyl)propionate] having a molar mass of 1177.67. Under more aggressive usage conditions (for example, in contact with hot water), however, a physical loss also results in the case of these antioxidants because of washing out processes. Therefore, the immobilization of antioxidants is of special significance. Although various possibilities are known for this purpose, bonding of the antioxidants to the polymer chains is recommended for the immobilization. In the case of polyolefins, because of the lack of functionalities along the polymer chain, the antioxidants must themselves have polymerizable functionalities. The bonding of the antioxidants to a polyolefin chain is performed via grafting in the presence of an initiator, typically a peroxide. This radical reaction preferably takes place in the polymer melt, wherein the required polymerizable functionalities on the antioxidants are ensured by the coupling thereof to acrylates, maleimides, or maleates. However, it is disadvantageous that the bonding of the antioxidants to the polyolefin chains takes place randomly according to a statistical distribution and with a comparatively low distribution density.

SUMMARY OF THE INVENTION

The invention is therefore based on the object of specifying a stabilizer for polyolefins, which has phenolic antioxidants having a high molecular weight and ensures an immobility of the antioxidants, which is essential for the longterm action.

The invention achieves the stated object in that the phenolic antioxidants according to the structural formula

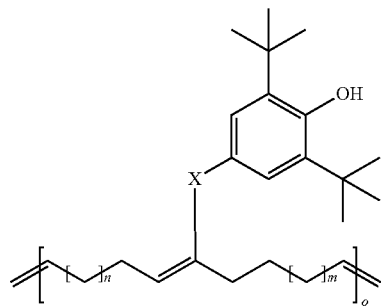

are bound as side chains to a polymer, wherein
X stands for [—$CH_2$—Y—COCH=CH—], [—$CH_2$—Y—CO—($CH_2$)$_p$—], or [—$CH_2$—Y—(OH$_2$)$_p$-] where Y=S, O, or NH and where p=0-10 and
n=1-8, m=1-8, and o=5-100.

Because of the specified polymer structure, the phenolic antioxidants on the basis of a 3,5-di-tert-butyl-4-hydroxyphenyl are bound as side chains to the polymer chain, which ensures the desired immobility of the antioxidants. In addition, the antioxidants can be regularly distributed along the polymer chain in a pre-definable distribution density depending on the requirements, wherein a substantially free selection of the molar mass of the antioxidants results. The polymer backbone of the polymer-bound antioxidants according to the invention consists of carbon. Heteroatoms do not occur in the backbone. The absence of heteroatoms in the polymer backbone is advantageous because of the better compatibility with polyolefins. Stabilizers according to the invention having the polymer-bound antioxidants can therefore be successfully added as the additive to the polyolefins.

If a 3,5-di-tert-butyl-4-hydroxy cinnamic acid is used as a phenolic antioxidant, it is thus obtained as a further advantage that additional double bonds are present as reaction centers. Good results are also achieved in this context using a 3,5-di-tert-butyl-4-hydroxy propionic acid.

To produce a stabilizer according to the invention, the phenolic antioxidants can be coupled to the functional groups of a polymer chain, which is obtained by an acyclic diene metathesis polymerization of a diene derivative. However, it is also possible to couple the phenolic antioxidants firstly to α,ω-diene monomers, before the obtained antioxidant structures, which are coupled to the α,ω-diene monomers, are converted into a polymer chain by an acyclic diene metathesis polymerization, which is accompanied by simpler method conditions.

Acyclic diene metathesis polymerization (ADMET polymerization) is a step-growth polymerization. To achieve high molar masses, high monomer turnovers are necessary, as in the case of all step-growth polymerizations. As monomers, α,ω-dienes are used, which enables the synthesis of exactly defined, linear, unsaturated polyethylene.

The catalysts which are most frequently used for ADMET polymerization are ruthenium and alkylidene complexes. Ruthenium catalysts have a large tolerance with respect to functional groups in ADMET polymerization, so that the possibility exists of polymerizing monomers which contain functional groups such as ketones, aldehydes, alcohols, esters, carboxylic acids, ethers, amides, siloxanes, and silyl chlorides.

Because of the typical diene structures of the monomers, the possibility opens up of using fatty acid derivatives based on vegetable oils, wherein castor oil suggests itself as the triglyceride of ricinoleic acid. 10-undecenoic acid, which is obtainable by pyrolysis of ricinoleic acid, can specifically be converted in a known manner by reduction into the corresponding undecenaldehyde, to convert the undecenal via an aldol condensation to the α,ω-dienal and by a further reduction to the α,ω-dienol, which are both suitable as starting monomers for a ADMET polymerization.

During the coupling of antioxidants to monomers suitable for ADMET polymerization, proceeding from 10-undecenal, an α,ω-diene is prepared, but it is not immediately polymerized. Instead, the reduction of the aldehyde to the alcohol and the subsequent coupling to the antioxidant are performed. In the coupling between monomers and antioxidants, esters, but also other compounds, such as ethers, thioethers, amines, or amides, can be used. The antioxidant structure coupled to the α,ω-diene is subsequently converted in an ADMET polymerization to synthesize polymer-bound, immobilized antioxidants.

The following example shows the structural formula of such a polymer-bound antioxidant, wherein in the illustrated molecule, 3,5-di-tert-butyl-4-hydroxy cinnamic acid is used as an antioxidant and is bound via an ester to the polymer chain:

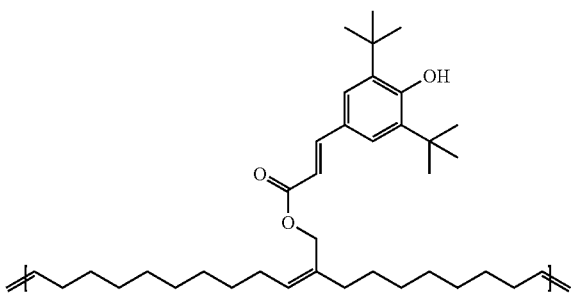

The mean molar mass of the polymer is dependent on the reaction duration, the temperature, the quantity of catalyst used, and the proportion of monofunctional monomers, which limit the growth of the polymer chain and are referred to as "chain stoppers". Since excessively long-chain polymers are not desired, 1-dodecene or 10-methyl undecenoate can be added as the "chain stoppers" during the reaction, to regulate the mean molar mass of the immobilized antioxidants. The compatibility with the polymers to be stabilized can thus be easily regulated. Molecular weights between 5000 and 50,000 are typically set in correlation with the polyolefin to be stabilized.

EXAMPLE

Firstly, α,ω-dienes are prepared in a known manner, specifically a (Z)-2-(non-8-enyl)trideca-2,12-dienal and a (Z)-2-(non-8-enyl)trideca-2,12-dienol.

In a typical reaction, 3.80 g of the previously prepared α,ω-diene (Z)-2-(non-8-enyl)trideca-2,12-dienol and 3.29 g (11.93 mmol) of the antioxidant 3,5-di-tert-butyl-4-hydroxy cinnamic acid are dissolved in 50 ml $CH_2Cl_2$ and provided in the round-bottom flask. The reaction mixture is stirred under $N_2$ in the ice bath and after 5 minutes 2.58 g (12.5 mmol) N,N'-dicyclohexylcarbodiimide (DCC) and 0.153 g (1.25 mmol) 4-(dimethylamino)-pyridine (DMAP) in 20 ml $CH_2Cl_2$ are added. After 48 hours stirring at room temperature under $N_2$, the reaction mixture is worked up. For this purpose, firstly the precipitated N,N'-dicyclohexyl urea is filtered off and subsequently the solvent is evaporated. In the further procedure, the product is received in a mixture of ethyl acetate and petroleum ether (1:1) and filtered via diatomaceous earth. After evaporation of the solvent, 5.5 g of the product is obtained in the form of a yellow, viscous oil. 1H NMR ($CDCl_3$, 300 MH/): δ (ppm)=1.20-1.50 (m, 40H, 11 $CH_2$+6 $CH_3$), 1.98-2.15 (m, 8H, 4 $CH_2$), 4.63 (s, 2H, $CH_2$), 4.90-5.05 (m, 4H, 2 $CH_2$), 5.51 (m, 1H, CH), 5.74-5.90 (m, 2H, 2 CH), 6.30-6.35 (d, 1H, CH), 7.38 (s, 2H, aromatic), 7.63-7.69 (d, 1H, CH).

For the polymerization of the monomer-bound antioxidants, with air exclusion, 5.41 mg (0.0086 mmol=1 mol % in relation to the monomer) of the HoveydaGrubbs first-generation catalyst (1,3-bis-(2,4,6-trimethylphenyl)-2-imidazolidinylidene)dichloro(o-isopropoxyphenyl-methylene) ruthenium and 2.8 mg (0.026 mmol) 1,4-benzoquinone are weighed out. Subsequently, 500 mg (0.86 mmol) of the previously prepared monomer-bound antioxidant and 5 mg 10-methylundecenoate are dissolved in 5 ml toluene and injected into the reaction flask. The flask is immersed in a 60° C. hot oil bath and the reaction mixture is stirred for 8 hours under $N_2$. The product workup is performed by precipitation in cold methanol. After separation in the centrifuge, a green, waxlike polymer is obtained as the product.

To mix polypropylene with the polymer-bound antioxidant, a laboratory extruder having a double screw is used. In a typical experiment, 5.00 g non-stabilized polypropylene and 30-50 mg polymer-bound antioxidant are used. The two polymers are guided in the loop at 220° C. under $N_2$ for 10 minutes for the mixing, the polymer melt is then discharged and cooled in water.

With the aid of a laboratory extruder, the stabilizer obtained from immobilized antioxidants is admixed with polypropylene. The polypropylene used is a non-stabilized product having an MFI of 0.28. During the compounding, the weight proportion of the quantity used of polymer-bound antioxidants is between 0.4 and 0.8 wt.-%. No further additives, i.e., also no process stabilizers, were added in addition to the polymer-bound antioxidants.

The stabilization of the polypropylene is subsequently studied in a standard method for analysis of the thermal stability of polymers (Oxidative Induction Time OIT) with the aid of a measurement method for determining the heat absorption or emission of a sample (Differential Scanning calorimetry). A static OIT measurement using oxygen as the flushing gas at 185° C. was selected. In the case of non-stabilized polypropylene, the oxidation reaction begins immediately after the switchover of the flushing gas from nitrogen to oxygen. In the stabilized product, the added antioxidants delay the beginning of the oxidation of the polymer by at least OIT=15 min.

The invention claimed is:

1. A stabilizer for polyolefins using phenolic antioxidants, wherein the phenolic antioxidants according to the structural formula

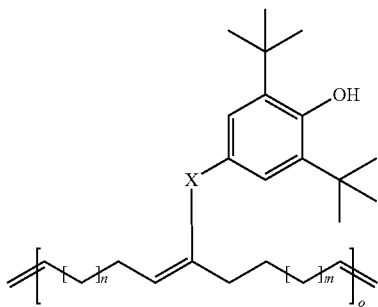

are bound as side chains to a polymer, wherein X stands for [—CH$_2$—Y—COCH=CH—], [—CH$_2$—Y—CO—(CH$_2$)$_p$—], or [—CH$_2$—Y—(CH$_2$)$_p$—] where Y=S, O, or NH and where p=0-10 and n=1-8, m=1-8, and o=5-100.

2. The stabilizer according to claim 1, wherein the phenolic antioxidants are a 3,5-di-tert-butyl-4-hydroxy cinnamic acid.

3. The stabilizer according to claim 1, wherein the phenolic antioxidants are a 3,5-di-tert-butyl-4-hydroxy propionic acid.

4. A method for preparing a stabilizer according to claim 1, wherein the phenolic antioxidants are coupled to the functional groups of a polymer chain, which is obtained by an acyclic diene metathesis polymerization of a diene derivative.

5. A method for preparing a stabilizer according to claim 1, wherein the phenolic antioxidants are first coupled to α,ω-diene monomers, before the obtained antioxidant structures, which are coupled to the α,ω-diene monomers, are converted by an acyclic diene metathesis polymerization into a polymer chain.

6. The method according to claim 4, wherein fatty acid derivatives based on vegetable oils are used for the synthesis of the diene derivatives required for the acyclic diene metathesis polymerization.

7. The method according to claim 6, wherein castor oil is used as the fatty acid derivative.

* * * * *